(12) United States Patent
Bartels et al.

(10) Patent No.: US 8,902,490 B2
(45) Date of Patent: Dec. 2, 2014

(54) DEVICE FOR FLUIDIC DISPLAY AND CORRESPONDING METHOD

(75) Inventors: Frank Bartels, Hattingen (DE); Juergen Rawert, Neuss (DE); Andriy Bitman, Dortmund (DE)

(73) Assignee: Advanced Display Technology AG, Appenzell (CH)

( * ) Notice: Subject to any disclaimer, the term of this patent is extended or adjusted under 35 U.S.C. 154(b) by 287 days.

(21) Appl. No.: 12/737,787

(22) PCT Filed: Aug. 18, 2009

(86) PCT No.: PCT/DE2009/001156
§ 371 (c)(1),
(2), (4) Date: Mar. 31, 2011

(87) PCT Pub. No.: WO2010/020225
PCT Pub. Date: Feb. 25, 2010

(65) Prior Publication Data
US 2011/0181940 A1    Jul. 28, 2011

(30) Foreign Application Priority Data
Aug. 20, 2008  (DE) .................. 10 2008 038 457

(51) Int. Cl.
*G02B 26/00*    (2006.01)
*G09G 3/34*     (2006.01)
*G09F 9/37*     (2006.01)
*G09F 13/24*    (2006.01)

(52) U.S. Cl.
CPC .............. *G02B 26/005* (2013.01); *G09F 9/372* (2013.01); *G09F 13/24* (2013.01)
USPC ............ 359/295; 359/290; 359/228; 345/107

(58) Field of Classification Search
CPC ...... G02B 26/00; G02B 26/02; G02B 26/005; G09G 3/44; G09G 3/3433; G09G 3/344; G09G 2300/00; G09G 2300/04; G09G 2300/0421; G09G 2300/0426; G09G 2300/08; G09G 2300/0809
USPC ......... 359/296, 245, 252–254, 228, 315, 316, 359/247, 272, 275; 345/60, 71, 84, 87, 93, 345/107; 204/450, 451, 600, 601; 349/86, 349/88; 313/231.31, 519, 582; 310/331, 310/332, 340, 358
See application file for complete search history.

(56) References Cited

U.S. PATENT DOCUMENTS 4,583,824 A    4/1986  Lea
5,731,792 A    3/1998  Sheridon
(Continued)

FOREIGN PATENT DOCUMENTS

DE    697 11 750 T2    9/2002
WO    WO 2007/017495 A2    2/2007
WO    WO 2008/046842 A1    4/2008

*Primary Examiner* — Loha Ben
(74) *Attorney, Agent, or Firm* — Marshall & Melhorn, LLC

(57) ABSTRACT

The invention relates to a display, for using liquids to display information and a corresponding method. According to the invention, said display comprises a number of display elements with cavities, at least one display liquid for displaying information and at least one liquid reservoir for providing the at least one display liquid, characterized in that each display element further comprises a dosing device, by means of which display liquid from the liquid reservoir may be dosed into and out of the display element. The dosing device thus permits a precise dosing of defined display liquid volumes into or out of the display element. The method in which said dosing device finds use is used for precisely repeated dosing of defined volumes of display liquid.

13 Claims, 3 Drawing Sheets

(56) References Cited

U.S. PATENT DOCUMENTS

| | | |
|---|---|---|
| 6,120,588 A | 9/2000 | Jacobson |
| 6,700,556 B2 | 3/2004 | Richley et al. |
| 6,819,309 B1 * | 11/2004 | Kishi ............................ 345/87 |
| 7,006,299 B2 | 2/2006 | Kroupenkine |
| 7,163,612 B2 * | 1/2007 | Sterling et al. ................ 204/600 |
| 7,304,786 B2 | 12/2007 | Hagood et al. |
| 7,551,344 B2 | 6/2009 | Hagood et al. |
| 7,595,925 B2 | 9/2009 | Valette et al. |
| 7,867,369 B2 * | 1/2011 | Bhullar et al. ........... 204/403.02 |
| 2005/0072946 A1 | 4/2005 | Studer et al. |

* cited by examiner

DEVICE FOR FLUIDIC DISPLAY AND CORRESPONDING METHOD

BACKGROUND OF THE INVENTION

The invention relates to the field of display devices for reproducing optical information. In particular, the invention relates to a display device which serves to visualize information by use of liquids as well as a corresponding method.

From the prior art there is known an almost overwhelming variety of display devices serving the reproduction of optical information, such as e.g. text, still images or even moving images (videos). While a large proportion of these display devices serves in particular to reproduce multi-colored and quickly varying information, solutions exist which focus on the reproduction of more static and optionally monochrome information.

As an example for such display devices, reference is made to the technology of "electronic paper" developed by the company E Ink (Cambridge, Mass./USA; www.eink.com). The document U.S. Pat. No. 6,120,588 ("Electronically addressable microencapsulated ink and display thereof") is mentioned in this respect. Herein, a plurality of tiny globules is used which can be oriented in an electric field and which are, for example, colored in white and black in equal share. By specific application of a corresponding electric field to certain display areas, the areas appear to be colored, whereas other areas appear uncolored. To enhance contrast, an opposed electric field can be applied to the remaining areas. In particular advantageous is the fact that such devices can be operated with low power, however, they offer slow reaction times and moreover the disadvantage that only a few colors can be displayed.

The problem of high energy consumption is encountered, for example, by document U.S. Pat. No. 7,304,786 owned by the company Liquavista (NL). The display principle described herein is based on the use of colored liquids, more specific of a two phase mixture made up of colored liquid (oil) and a carrier liquid (water). Switching of a single image dot occurs by means of the effect of electrowetting. By means of this effect, the shape of the oil droplet incurring the color impression can be changed. However, the amount of colored liquid present in a respective image dot is constant and can only be modified with respect to its shape. By utilizing the effect of electrowetting, energy input can be dramatically lowered, since power needed therefore is comparatively low. However, the power must be provided always if an image deviating from a rest position is to be displayed. Such a rest position results from the fact that the colored liquid without power feeding is homogeneously spread over the area of an image dot resulting to a correspondingly fully colored image dot. Furthermore, such display devices are suitable only for operation at normal ambient temperature. Moreover, these pixels include merely one color, so that display of plural different colors can only be achieved by means of a close arrangement of differently colored "subpixels" and use of optical fusion thereof to perceive one pixel. Aging finally leads to undesired degradation after a while which cannot be remedied, since due to the fixed volume of colored liquid of an image dot no exchange of degraded liquid is possible.

A first disadvantage of the solutions proposed by the prior art is based on the fact that for displaying information an (electric) power must be present, even if the content of the display does not change. Another disadvantage of known display devices based on the use of colored liquid is seen in the fact that these display devices often include display elements ("pixel") consisting of two chambers, one of them serving actually to display information, whereas the other one is used as a reservoir in case that the corresponding pixel is not to be displayed at the moment. These constructions are complex as well as error-prone. As further disadvantage is seen in the fact that such two chamber solutions comprise a correspondingly larger footprint, unless the chambers are arranged respectively below the corresponding image dot which in turn leads to fluidically complicated constructions. Solutions, which utilize pumps for moving the liquid(s) can barely be realized, since either a plurality of pumps were necessary or corresponding complex switching valves had to enable a selection of the pixel to be driven, resulting to in particular extremely long switching times for an image often comprised of many thousand of pixels.

US 2005/0072946 A1 discloses a fluidic display device having display elements comprising a cavity and wherein at least one liquid reservoir for providing at least one display liquid is provided. Moreover, each display element includes a dosing mechanism, consisting of valves, by means of which the display liquid can be dosed from said at least one liquid reservoir into said display element and vice versa.

DE 697 11 750 T2 discloses an electro capillary display sheet wherein by means of electrodes a liquid transport between a reservoir and a display pixel is induced and the display liquid is provided via a capillary tube.

SUMMARY OF THE INVENTION

It is therefore the object of the invention to provide a device which overcomes the disadvantages of the prior art. In particular, the device should exhibit a low power consumption. Thereby, the display device should in case of a static image have no or only a very low power consumption. Finally, the device should allow colored representations and representations with different brightness levels besides a monochrome representation. An image dot should therefore be able to display graded saturations and/or brightness of different levels, where it is desirable that this impression is individually adjustable for each image dot. Finally, it is desirable to provide for a possibility to exchange exhausted, such as color-degraded, liquid to ensure long lasting reproduction of the original colors. Moreover, the invention should provide a method which utilizes the device.

The object is solved by a device as well as by a method in accordance with the invention. Correspondingly, a fluidic display device is provided which includes display elements, which are preferably arranged in columns and lines. Thereby, the power necessary to move the display liquids results from an effect which influences the surface energy of the display liquid, preferably from the effect of electrowetting. According to the invention, the device includes dosing devices which supply or remove a defined volume of display liquid to or from the respective display elements. After the dosing process, the generated volume of display liquid, which is for example present as a droplet, remains in the respective display element without power being needed. The colored liquid, thereby, is preferably provided by a central reservoir which is fluidically connected with all display elements and supplies colored liquid to them.

Each display element of the device according to the invention further includes at least one collector means for display liquid comprising respectively at least one collector electrode. Thereby, this collector electrode is arranged in the respective display element such that an electric field can be applied to the display liquid present in the respective display element. The collector means for display liquid therefore has the task to collect the liquid present in the cavity of the display element in case of removal of display liquid at a specific location of the display element, so that a particularly effective removal is possible. To achieve this, the collector electrode comprises a shape which under control is suitable to transport display liquid preferably to a specific location of the display element. To achieve this, the collector electrode possesses a beam-like shape with arms widening to the corresponding site, so that correspondingly higher electric field strengths are found and consequently a preferred transport of display liquid occurs.

Further preferred embodiments can be found in the following detailed description and in the figures.

The device according to the invention embodied as a fluidic display device includes in a "basic version" a number of components or groups of components which are described in detail below.

For displaying information, the device includes at least one display liquid. It can preferably be colored, so that areas of the display device exhibit the corresponding colors when filled with the display liquid. Plural display liquids can also be provided, wherein depending on the selected display liquid the corresponding color or the corresponding color shade or brightness level is represented. Thereby, areas of the display can be filled only with a first, others only with a second display liquid. It is, however, also possible, to fill the same area consecutively with different display liquids, wherein it goes without saying that in this case corresponding means for selecting a display liquid must be provided.

The display device includes a plurality of display elements for receiving display liquid. Each of these display elements serves to represent an image dot ("pixel"). This image dot is formed essentially by a cavity which is visible by a viewer. Depending on the filling level of the cavity, the image dot is switched "on" or "off". By intermediate levels of the filling state a corresponding saturation or brightness level can be achieved. For example, if there is display liquid only in half of the cavity, this will, in case of black display liquid in front of a white background, correspond to a grey level of for example 50%.

For delivering of said at least one display liquid, the device can further include at least one liquid feeding mechanism. This liquid feeding mechanism has the task to deliver a larger volume of display liquid within the display device, into the display device or out of the display device, wherein until now no detailed selection of individual display elements is provided. Basically, all liquid feeding mechanisms known from the prior art or to be developed in future can be considered. In particular preferred are micropumps, in particular piezomembrane actuated micropumps. However, other methods, such as e.g. electroosmotic methods or expansions caused by temperature gradients, are conceivable for delivering the display liquid. One advantage of the invention is founded in the fact that the delivery power which is considerable in particular in view of large area displays can be provided by correspondingly dimensioned pumps. This enables a good scalability of the device according to the invention for different fields of application. As desired, the liquid feeding mechanism can be included in the fluidic display device or can be associated thereto as an external mechanism.

Further, the device comprises at least one liquid reservoir for temporarily receiving said at least one display liquid. It is clear that for a plurality of display liquids the same number of liquid reservoirs is to be provided, if the single display liquids are not allowed to mix. It is thereby possible, that each display element has its own liquid reservoir or that plural, in particular preferred all the display elements are fluidically connected to a so called central liquid reservoir.

In case that each display element is not associated to an own liquid reservoir, the device according the invention includes at least one common main duct for simultaneously filling a plurality of display elements. This main duct is configured such that plural of the display elements are fluidically connected. In this way, plural display elements can be combined to form one or plural groups, wherein each group can possess its own main duct.

Now, it is provided according to the invention that each display element of the device further includes a dosing device by means of which display liquid may be dosed into and out of the display element from said at least one liquid reservoir. This dosing device thereby comprises the characteristic to dose in or out of the respective display element defined volumes of display liquid. In this manner it becomes possible to fill the respective cavity not 0 or 100%, but, depending on the resolution of the dosing device, in smaller steps, for example 10%. Would, for example, the cavity be able to contain 10 droplets of display liquid, wherein each droplet could be dosed in a defined (i.e. or predictable, respectively) manner into the cavity, the filling degree could be varied in steps of 10%.

It is in particular preferred to provide that the dosing device is suitable not only for filling, but also for emptying the respective cavity by defined volumes of liquid. Depending on the construction type, the dosing device may always dose equal volumes of defined display liquid or even different volumes thereof. It must merely be ensured that the respective dosed volume can be pre-determined. Alternatively or additionally, it can be provided that a means for measuring volumes is present which can determine the volume of display liquid flowing into a cavity or being removed therefrom, for example by means of a flow measurement, a weight measurement, a measurement of optical transmission, by means of capacitive sensors, by means of measuring resistance etc. Essential is merely that the precise volume of display liquid present in a respective cavity is known so that in absence thereof it can be additionally dosed, in excess thereof, it can be removed, until the desired volume is present in the cavity.

It is in particular preferred that the device according to the invention, alternatively or additionally to the at least one liquid reservoir comprises at least one central liquid reservoir which is in fluidic connection with a plurality of display elements. In other words, it is preferred that some, in particular preferred that all display elements are fluidically coupled to a single central liquid reservoir.

According to a preferred embodiment, the so called effect of electrowetting is used for influencing the surface energy. To achieve this, the display liquid can be influenced in its surface energy by an electric field. To generate this electric field, the respective mechanism for influencing the surface energy includes at least one electrode which is arranged in the respective display element such that an electric field can be applied to the display liquid present in the respective display element. In other words, the display liquid is subjected to a switchable electric field in which it changes its surface energy and therefore its wetting behaviour.

Thereby, the mechanism for influencing the surface energy can in particular be provided to serve as a driving mechanism for said dosing device.

The display liquid can thereby consist of a color carrying liquid alone, or it can be embedded into an (electrically inert) carrier fluid. As the display liquid, in particular electrically activatable liquids from the group comprising the substances propylene carbonate, diethyl carbonate, diacetone alcohol, cyclohexanone, butyl acetate, propyl acetate and ethylhexanol are considered, whereas the electrically inert fluid preferably originates from the group including the substance group of gases, of oils or oil containing liquids, respectively, and fluor containing liquids. It is in particular preferred that no silicone oil is used as the carrier fluid.

According to a particularly preferred embodiment, the dosing device according to the invention is constructed to include a dosing duct for receiving the volume of display liquid to be dosed having a group of independently controllable dosing electrodes for dosing a defined volume of display liquid. Thereby, the dosing electrodes are arranged such that a locally variable electric field can be applied to the display liquid present in the dosing duct. For example, the dosing duct may comprise three adjacent dosing electrodes which are electrically isolated from another and independently controllable and are located at the bottom of the dosing duct. Optionally, one or more counter electrodes may also be provided, to orient and/or to amplify the electric filed. Display liquid will respectively move or spread, respectively, to those dosing electrodes which are being driven. Similarly, the display liquid will move from those dosing electrodes which are not being driven. The functional mode of such an arrangement of dosing electrodes will be further explained with respect to the method according to the invention.

It is clear that said dosing duct is fluidically arranged between said at least one liquid reservoir or the central liquid reservoir, respectively, and said display element. In this way it is ensured that any display liquid which flows into or out of the display element must flow through said dosing duct in which the corresponding volume can be dosed.

Thereby, the display liquid can be provided either passively at the end facing to the liquid reservoir and can, for example, be guided to the dosing duct by means of capillary forces, or it can be actively transported thereto, for example by means of a liquid feeding mechanism. The passive alternative is preferred, which is sufficient in particular in the case of low flow volumes per time unit and has the advantage of absence of any moving parts. According to a further embodiment it is provided that all collector means for display liquid and all dosing devices of the device according to the invention are independently controllable. In this manner, all display elements can be filled or emptied, respectively, at the same time, since each display element can comprise own controlling sequences for collector and dosing electrodes. Thereby, a particularly speedy changing of the entirety of information represented by means of the fluidic display device is possible. This is an advantage in particular in the case of moving images. In addition to the alternative just described and referred to as "active" of the device according to the invention, it may also be preferable to provide an alternative which may be referred to as "passive". "Passive" means that not a single display element, but a group of display elements is jointly controlled. Since the arrangement of elements is preferably like a matrix, i.e. contains columns and lines, in a passive variant either the display elements of a column or those of a line can be jointly be filled or emptied.

In a first embodiment of the passive alternative, the device according to the invention comprises a plurality of lines of display elements and further a means for column selection, wherein the respective collector means for display liquids are jointly controllable line by line. This means that when a line is controlled, collector means for display liquid fill or empty all display elements, for which the corresponding dosing device is simultaneously active. Since in a normal case not all display elements of a display device comprise the same filling level, a single column must be selected, so that only the display elements of this column fill or empty, respectively, in this way. Since the collector means for display liquid arranged in lines are individually controllable line by line, all display elements of the selected column can be simultaneously filled or emptied, respectively, in this situation.

Similarly, there is provided in a second embodiment of the passive alternative that the device according to the invention comprises a plurality of columns of display elements and further a means for column selection, wherein respective dosing electrodes of dosing devices are jointly controlled column by column. In this case, firstly a selection of a line must occur, since otherwise all lines of display elements would be simultaneously filled or emptied, respectively, with a same volume of display liquid, which normally is not desired.

Finally, according to a third embodiment of the passive alternative, it can be provided that all collector means for display liquid are jointly controllable line by line and all dosing electrodes of the dosing devices are jointly controllable column by column. To achieve this, it is necessary to select the respective line as well as the column, so that only that display element present at the respective section point is actually filled or emptied, respectively.

An advantage for these passive embodiments is the smaller number of collector and/or dosing electrodes which are to be controlled, since in the scope of the above example only so many collector electrode controls are necessary as the display device comprises lines, or only so many dosing electrodes controls are necessary as the display device comprises columns, multiplied by the number of dosing electrodes per dosing device.

A disadvantage however is the fact that updating the display device can only occur column by column or line by line, respectively, since there is no other way for a corresponding selection of the respective display elements. For this reason, it may be referred to a "passive matrix". Preferably, the display elements are substantially two dimensional. In particular preferred embodiment, they are rectangular and are more preferably square. "Two dimensional" in this context means that the dimensions of the cavity in those spatial directions which are about perpendicular to a viewing direction B, are considerable larger as seen in viewing direction. The cavity is therefore "shallow".

Alternatively, however, the cavity can also be three dimensional, i.e. and comprise a comparable dimension also in viewing direction or can be even "rod-shaped". In this way, layers of display liquid which are different in thickness can be used in a cavity to create different color saturations or brightness levels. To achieve this, further wall electrodes can be provided, where the potential for creating the electric field can be increased or decreased to achieve different wetting results and therefore different volumes of display liquid distributed in the cavity. By a concentration of display liquid at the walls, for example, a different optical impression is achieved as by a freely and uniformly distributed display liquid. If the walls of the cavity cannot seen by the viewer, adhesion of the display liquid at the side walls is practically equivalent to a removal of display liquid from the respective display element. This effect can preferably be used supplementary to the dosing device. For the case of the device of the invention which has been further described above, which uses the effect of electrowetting, it is preferred that the at least one collector electrode of a display element (seen in viewing direction) is respectively arranged in front of and/or behind the cavity of the respective display element, whereas the above mentioned additional wall electrode is preferably arranged lateral to the cavity.

"In front of" the cavity means, that, seen in viewing direction, firstly the collector electrode is arranged, "behind" the cavity, the order is reversed. In the first case it is in particular preferred that the electrode consists of a transparent material, as it is for example known from LCD technology. "Laterally" to the cavity means that the wall electrode extends approximately in viewing direction, so that the viewer so to say looks onto an edge of the electrode. In this case, it is not necessary that the electrode consists of a transparent material.

Thereby, it is also conceivable that (in particular in case of a "passive matrix") a laterally arranged wall electrode simultaneously supplies two adjacent display elements. In this way, the number of wall electrodes may be cut to half.

As already explained, it is provided according to one embodiment, that each display elements comprises respectively only one collector or wall electrode and/or group of dosing electrodes, so that the electric field can build up between these electrodes and the environment. To achieve at a better control over the developing electric field, it is therefore preferred to provide one or more counter electrodes which are arranged such that said cavity and optionally said display liquid is present between the electrode(s) and the counter electrode(s). Thereby, the display can comprise a large area common counter electrode, or single display elements or groups thereof may comprise their own counter electrodes.

According to an alternative embodiment, the counter electrodes can be located in the same plane as the electrodes and can, as an example, be arranged alternately parallel side by side, or a common electrode per display element can be arranged circularly at the periphery of the display element.

According to a further embodiment, those portions of the fluidic display device coming in contact with the display liquid are partially or in total hydrophobically and/or hydrophilically coated. In this way, the wetting behaviour can be controlled additionally, so that in particular effective influences are possible.

According to a further embodiment, at least one means for pressure equalization of the cavities of the display elements is further included. If display liquid is introduced into a cavity and if the fluid volume (e.g. air or a carrier fluid) which is pushed away cannot escape, a counter pressure builds up which strongly increases for increasing filling. A correspondingly high necessary feeding pressure results, as well as the necessity of a corresponding mechanical stability of the display elements which must withstand the pressure. Therefore, it is preferred to trap the pushed volume either temporarily at another site (which is not visible) (trapping reservoir), or (in particular in the case of air as the pushed volume) to provide vents from which the pushed volume can escape and through which it can flow back during subsequent extracting of display liquid from the cavity, since otherwise analogously a subpressure would build up. It is in particular preferred to create a fluidic circuit which causes that the pushed volume flows back via corresponding ducts in the display liquid reservoir, so that a substantially pressureless, but closed fluidic (circuit) system will result.

According to a further preferred embodiment, it is provided that a plurality of display elements can be combined to form "tiles". A "tile" according to the invention therefore includes a plurality of display elements, optionally one or more main ducts, means for influencing the surface energy (collector electrodes, dosing electrodes, wall electrodes), and optionally also display liquid reservoir(s) and optionally display liquid feeding mechanisms. However, it can be provided that single tiles do not possess an own display liquid reservoir and/or a display liquid feeding mechanism, but are fluidically connected to adjacent tiles, so that for example display liquid reservoirs and/or display liquid feeding mechanisms for operating a plurality of tiles arranged at the periphery of the display device can be used. To achieve this, corresponding interfaces of fluidic and/or electric type are provided. Thereby, a tile may consist of only one column; it is however preferred that a tile has a rectangular and in particular preferred a square format and then includes the same number of columns as there are display elements in one column.

According to a preferred embodiment, a tile according to the invention, or the entire display device as long as it comprises only a single tile, is arranged in layers. These layers are:

a transparent cover layer common to all display elements at least in the region of the cavities of the display elements, a patterned chamber layer having partitions for constraining the individual display elements, and a common bottom layer for fluidic closure.

The respective one tile thereby includes for fluidic supply of all display elements further either a patterned main duct layer or main ducts integrated into the chamber layer or a reservoir layer as well as passages to the display elements.

Thereby the display can be embodied in a particularly preferred manner as made of plastic or of glass and as a rigid substrate-like plate or as a sheet. It covers all display elements simultaneously and is applied for example by means of adhesive or welding technique to the underlying layer.

Chamber layer contains or forms per definition the cavities of the display elements or serves to constrain them, respectively. It is in particular preferred to design this layer as a grid like layer, wherein grid rods form the partitions between the single display elements. The single cavities may, as needed, comprise a square, a rectangular, a honeycomb any other shape. Alternatives can be provided which do not create any cavities, for example in case of a display device adapted to specific apparatus wherein the display elements are not holohedrally but only partially needed, however, the display device, resulting from economic consideration, should be manufactured and assembled as a whole and not as plural separate units.

Thereby, it is in particular preferred that two dosing devices are arranged between two adjacent display elements in a recess of a common partition. In the center of this recess of the partition, there is a fluidic passage facing to the fluid reservoir, and at both ends, the recess comprises openings to respective display elements. On the fluidic path between passage way and openings, the dosing electrodes of the respective dosing device are arranged. According to a further embodiment, the arrangement of the elements may be such that four display elements commonly share a centrally provided passage from which the corresponding dosing devices radiate in a star-shaped manner.

The common bottom layer serves to fluidically close the tile and can preferable be made from the same material as the cover layer, so that it is to be combined with the main duct layer by means of the same techniques.

Thereby, it is preferred that, as far as possible, all fluidic connections extend within the partitions of the display elements to achieve at a compact construction with only a few layers which must be joined.

As an alternative, some or all of the duct can be arranged in a separate main duct layer. For example, the main duct(s) may be arranged in this main duct layer, which e.g. serve to fluidically connect the display element with the display liquid reservoir e.g. column by column. It is particularly preferred to embody this layer also as a grid so that it can be manufactured in a particular easy way.

Finally, it is preferred to provide that the display liquid reservoir(s) is/are arranged in a specifically provided reservoir layer. Thereby, the single reservoirs may be separated by partitions or may be, as it is in particular preferred embodied as a large contiguous volume.

As an alternative to the constructive subdivision as described, the subdivision into layers may also be merely of functional nature, i.e. so that in a configuration plural layers consist of one and the same component which in turn is then for example patterned layer by layer, or, as in the case previously described, configured in an integrated manner. If corresponding electrodes are present, it is thereby furthermore in particular preferred that the device according to the invention further includes a layer for receiving the respective mechanism(s) for influencing the surface energy with passages to each display element. Alternatively, the respective mechanism(s) for influencing the surface energy may also be applied in form of metal coatings onto the corresponding layers, for example by vaporizing, sputtering, galvanic coating etc. In this case, again it can be talked of only one functional layer which, however, is not configured as a separate component.

According to the invention it is preferred that the device comprises means by which the state of the display elements can be recognized more easily. Therefore, it is preferred that the common bottom layer includes active and/or passive illuminating means and that all further layers are at least partly transparent and/or opaque. Passive illuminating means are for example reflection layers and the like are not illuminated themselves but reflect incoming light. Active illuminating means are for example light emitting diodes (LEDs), organic LEDs (OLEDs) as well as other illuminating substantives which are in particular flat illuminating substances. It may also be provided that the device according to the invention has both types of illuminating means in order to operate by means of active techniques for example in darkness and during the day by means of passive techniques which then are energy saving.

According to another preferred embodiment, the device according to the invention includes plural chamber layers and, optionally, main duct layers which are stacked upon another and therefore form stacked "display layers". It is clear that in this case only the bottom layer of the lowermost layer or that most remote from the viewer needs to be not transparent or opaque, since otherwise only the uppermost "display layer" which is closest to the viewer could be seen.

This configuration is in particular reasonable when the single chamber layer can be filled with differently colored display liquids. By the stacked display elements and the illuminating means arranged therebelow, the impression of mixed colors results, so that the display device is not limited to the reproduction of monochrome images. But also when similar display liquids are used, a different impression of brightness or saturation can be created by plural separate layers. Depending on the desired color space on which the display device is based, for example three (e.g. RWB, CMY) or four (e.g. CMYK) "display layers" are needed.

It is added that also here a separation only according to function, but not compulsorily by construction, of the single layers occurs; for example, the bottom layer of the first "display layer" may simultaneously form the cover layer of the underlying "display layer". Also an integrated construction, as described above in the case of a common chamber and main duct layer, is conceivable.

The invention also provides a method which is in particular preferably performed by using the device according to the invention.

Correspondingly, a method for displaying information is concerned wherein an image to be displayed may be divided into single image dots which in turn can be displayed by display elements. This corresponds largely to the type of a display known from the prior art by using a plurality of image dots, such as e.g. digital computer displays and the like. To perform the method according to the invention, the following basic steps are provided:

(a) At first, the (optionally respective) display liquid from the respective liquid reservoir or the central liquid reservoir, respectively, is provided at the dosing duct. The display liquid may thereby provided either passively at the end of the dosing duct facing to the liquid reservoir and may be guided to the dosing duct for example by means of capillary forces, or actively transported thereto, for example by means of a liquid feeding mechanism.

(b) Subsequently, a defined volume of display liquid is dosed into the respective cavities or from the respective cavities of the display elements. This is done by preferably using the dosing device according to the invention.

(c) Thereafter, step (b) is repeated until the desired total liquid volume is present in the cavity. In other words, the dosing device dozes as often into and from the cavity, until the desired volume of display liquid remains in the cavity. To achieve this, preferably a respective counting or measuring device must be provided which is optionally coupled to a memory, so that information about the current volume of display liquid present in the respective cavity is available at any time. During step (c), additionally, receiving of a respective counting pulse and optionally storing the current volume of display liquid present in the display element occurs.

In the following, the process of dosing a defined liquid volume into the display element is described in detail. To achieve this, the following steps (b1) to (b5) are to be performed:

(b1) Switching on at least that dosing electrode which is most remote from the cavity of the display element, so that display liquid moves from said liquid reservoir into said dosing duct;

(b2) Optionally switching on the other dosing electrodes, so that finally a volume of display liquid is present in said dosing duct which is larger than the defined liquid volume;

(b3) Switching off some of the dosing electrodes so that on those dosing electrode(s) which is/are still switched on, a separated droplet of display liquid having a defined liquid volume remains;

(b4) Additional switching on of those dosing electrode(s) which are arranged between the cavity and the defined liquid volume, so that the defined liquid volume spreads in direction of the cavity; and (b5) Successive switching off of dosing electrodes from direction of the liquid reservoir, so that the defined liquid volume is delivered in direction of the cavity.

By receiving a sufficiently large volume of display liquid in the dosing duct and by subsequently reducing this volume in a defined manner, it is ensured that always the same volume of display liquid is output which subsequently by respective controlling of dosing electrodes is delivered into the display element. There, the display liquid, preferably present as a droplet, remains until it is dosed out of the display element, as will be described below.

(B1) Optionally switching on the collector electrode for display liquid, so that display liquid in the region of the cavity which is closest to the dosing duct is collected;

(B2) Switching on at least that dosing electrode which is closest to the cavity of the display element, so that display liquid moves from the cavity into the dosing duct;

(B3) Optionally switching on the other dosing electrodes, so that finally a volume of display liquid is present in the dosing duct which is larger than the defined liquid volume;

(B4) Switching off some of the dosing electrodes, so that a separate droplet of display liquid having a defined liquid volume remains on those dosing electrode(s) still switched on;

(B5) Additionally switching on those dosing electrode(s) which are arranged between the liquid reservoir and the defined liquid volume, so that the defined liquid volume spreads in direction of the liquid reservoir; and (B6) Successive switching off dosing electrodes from direction of the cavity (2), so that the defined liquid volume is delivered in direction of the liquid reservoir.

Dosing out thereby occurs analogously to dosing in, but in a reverse direction. Additionally, a collector electrode, if any, is used which serves to concentrate the display liquid present in the display element at a suitable site (c.p. description of the device above). Switching off the collector electrode for display liquid may occur after step (B4), but not earlier. Transporting excessive display liquid in direction of the display liquid reservoir happens again in an "active" or "passive" form.

In case of an "active matrix" filling of all display elements occurs simultaneously. To achieve this, all collector electrodes and/or dosing electrodes of all display elements are simultaneously, but independently controlled, so that a very quick adaption of the content of the display device can occur.

In the case of "passive matrix", however, filling occurs columns by column or line by line, respectively. To achieve this, a selection of the display element(s) must occur prior to step (a) as described above, i.e. prior to the dosing process. Depending on the embodiment, this can be a specific column or line of display elements to be filled. By controlling a line of jointly controllable collector means for display liquid or a column of dosing electrodes, respectively, according to the invention, it is subsequently dosed in and out of the display elements only of this column or line, respectively. This process is repeated thereafter, provided a prior selection of another column or line has been made, until all desired columns or lines, respectively, are selected and the desired image impression is achieved.

In case that the collector means for display liquid as well as the dosing electrodes are respectively coupled line by line or column by column, respectively, a selection of both a specific line and a specific column occurs analogously, so that subsequently only that display element is updated which is located at the corresponding crossing point.

Of course, it is however also conceivable, that only a part of the columns and/or lines or display elements, respectively, is updated, namely for example, if only parts of the image must be modified, whereas other parts may remain unmodified.

To update a whole image, and independent of the "active" or "passive" alternative, it is provided according to the invention, that the method according to the invention further includes one of the following steps, if the corresponding components are present:

optionally, selection of the tile to be filled; and
optionally, selection of the chamber layer to be filled and the display liquid.

Also these steps must be performed prior to the filling process (step a). Also the entire sequence must be repeated until the desired number of tiles and/or chamber layers has been updated.

It is clear that depending on the concrete embodiment of the device even hybrids and deviations which are not explicitly described, are conceivable, without deviating from the basic principle of the invention.

DETAILED DESCRIPTION OF THE INVENTION

Figure 1A:
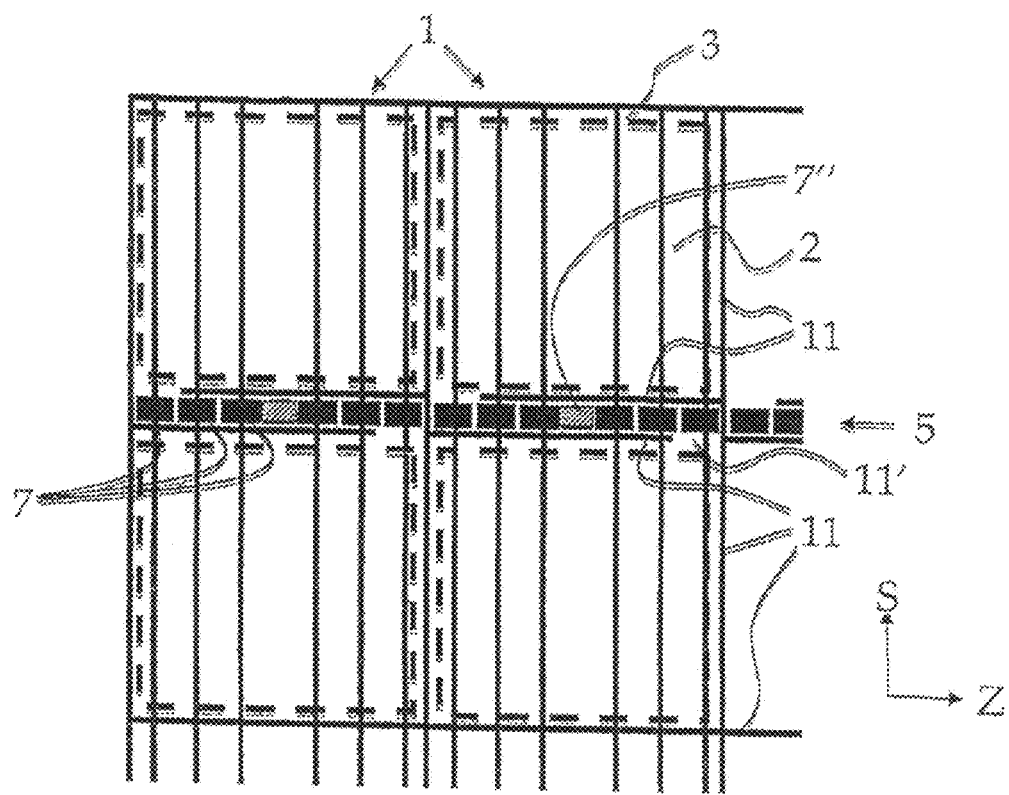
FIG. 1A schematically shows four display elements with dosing electrodes and filling ports in a top view.

FIG. 1A shows the example of four adjacent display elements 1 of the display device. For sake of clarity, repetitive or plural elements have been indicated only once. Each display element 1 consists of a cavity 2 providing a display region 3 which for reasons of representation is bordered by a dashed line. Display element 1 is separated from adjacent display elements 1 by respective partitions 11. There is a partition having a recess 5 between respective two display elements 1. In the center of the recess 5, a passage 7" shown as hatched area is provided. Further, a plurality of electrodes 7 (shown in full black) is located in the recess 5. Vertically in the figure (column direction S), electric contacts are drawn which in the embodiment as shown do not terminate at a specific dosing electrode 7, but traverse the display elements 1, so that dosing electrodes of underlying and/or overlying display elements are also contacted and can therefore be driven. Correspondingly, the dosing electrodes are connected column by column.

Recess 5 together with the dosing electrodes 7 form essential components of the dosing device according to the invention. At the end of recess 5 facing away from passage 7", there is a gap 11' in partition 11 through which display liquid can be dosed in and out of the display element 1.

Figure 1B:
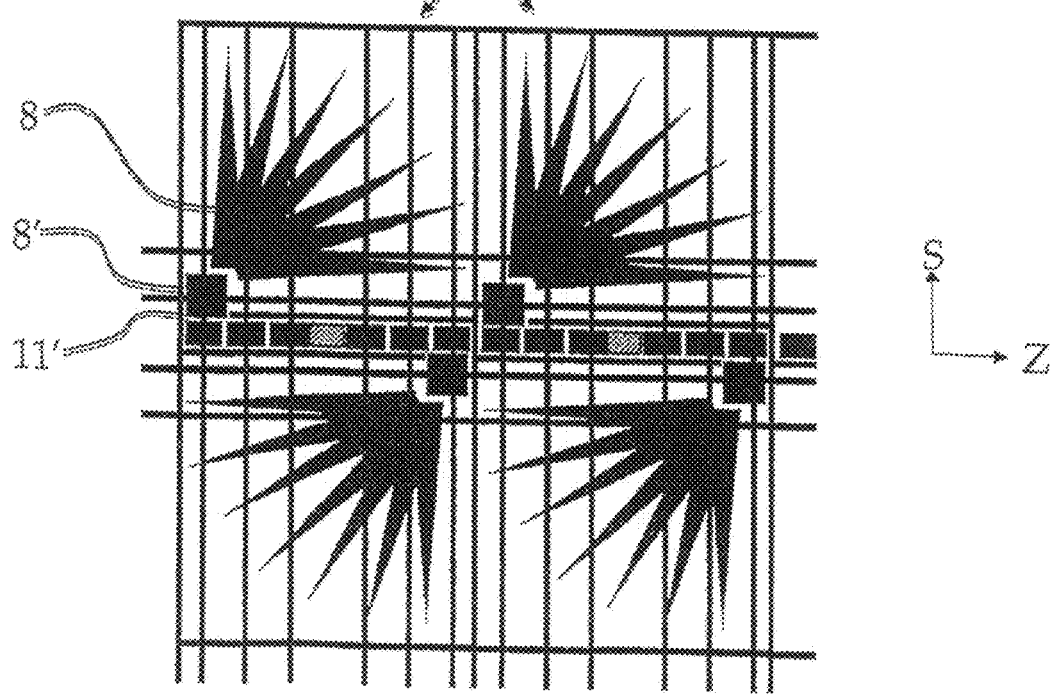
FIG. 1B shows the elements of FIG. 1A together with additionally arranged collector electrodes for display liquid.

In FIG. 1B, the display elements 1 of FIG. 1A are represented, wherein additionally collector means for display liquid are present which include in the embodiment as represented respectively two collector electrodes 8, 8'. Main collector electrode 8 is configured as a beam, wherein the arms of the beam in direction of gap 11' are widening even more. In this way, when controlling the main collector electrode 8, a stronger electric field results proximate to gap 11' than at the ends of the beams, so that the display liquid will move preferably in direction of gap 11'. For collector display liquid, additionally, a supplemental collector electrode 8' is arranged directly in the region of gap 11'; however, this one is optional.

Collector electrodes 8, 8' are connected by means of horizontally extending (line direction C) electric contacts such that a control of all collector electrodes 8, 8' present in a line is simultaneously possible line by line. In the embodiment as represented, also main and supplemental collector electrodes can be driven independently of another.

Figure 2:
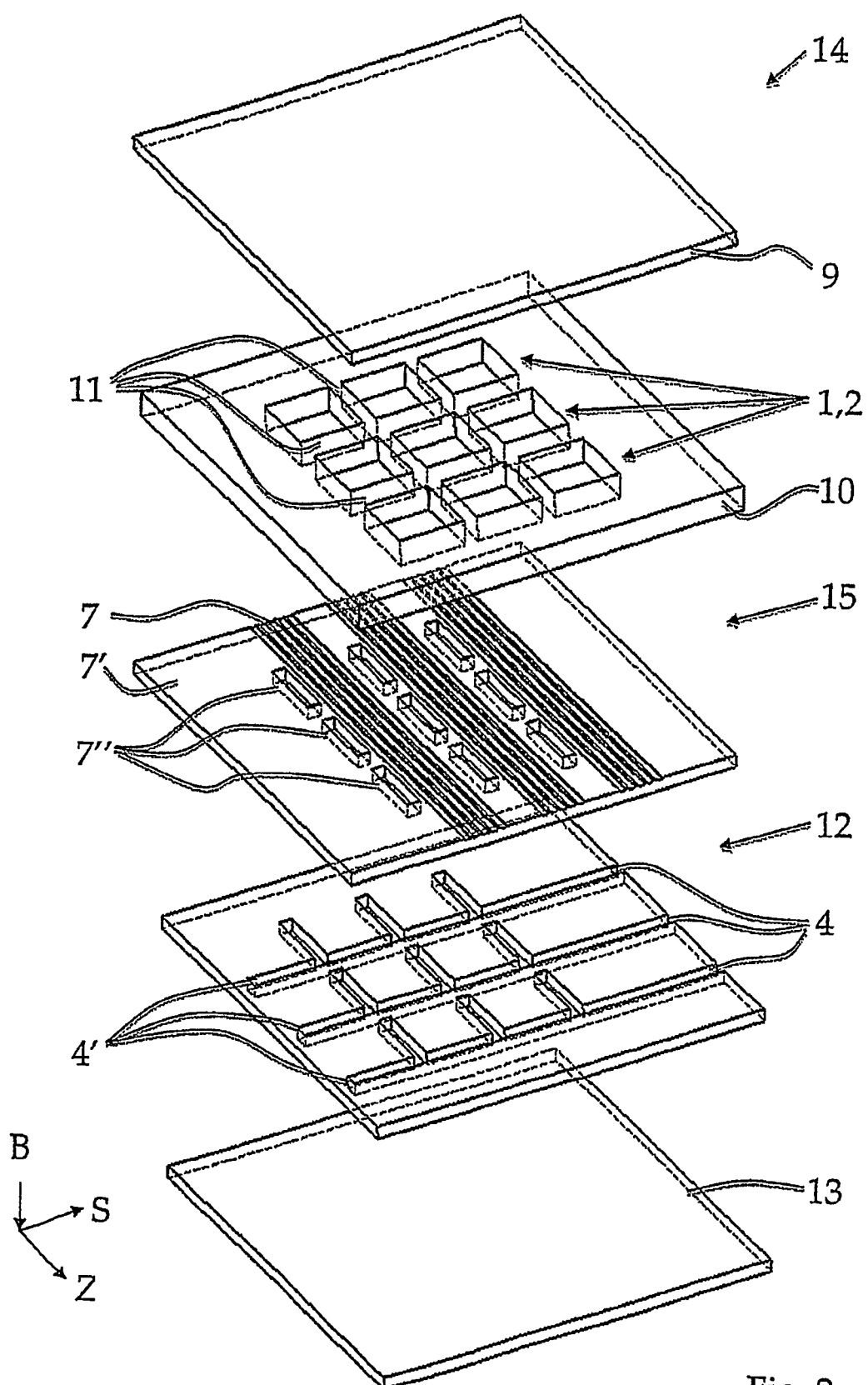
FIG. 2 shows an exploded view of an embodiment of the device according to the invention present as a layered construction.

FIG. 2 shows the exploded view of an embodiment of the device according to the invention configured as a "tile" 14 arranged in a layered construction. Top most represented is a cover 9 covering all display elements 1 of tile 14. Underlying is a chamber layer 10 which includes cavities 2. Between cavities 2 grid like partitions 11 are located which delimit the single display elements 1 from one another. Recesses 5 which are preferable present according to the invention, are not represented, in which dosing devices, also not represented, are located. Below chamber layer 10, an electrode layer 15 is arranged, wherein this electrode layer 15 consists of electrodes 7, 8, 8' and electrode support layer 7'. Electrodes 7, 8, 8' are formed, in the embodiment as represented, by means of corresponding electrical paths continuous in a line direction Z or a column direction S, respectively, so that an electrical connection to optionally provided adjacent tiles 14 (not represented) is possible. For fluidically connecting the chamber layer 10 and a main duct layer 12 arranged underlying electrode layer passages 7" are located at respective sites of electrode support layer 7'. Underlying electrode layer 15, a main duct layer 12 is arranged. Similar to chamber layer 10, it consists of a plate like material into which the respective duct patterns are introduced. In the embodiment as represented, main ducts 4 extending in a column direction S and transverse ducts 4' extending at an angle of 90° therefrom are shown. Transverse ducts 4' are arranged such that they underlay passages 7" of electrode support layer 7'. For sake of simplicity, ducts of main duct layer 12 can be patterned down; however, it is alternatively possible, that they (for example by reasons of stability) comprise a depth which is lower than the depth of the main duct layer 12. For fluidically closing the represented tile 14, a bottom layer 13 is provided on its bottom side which fluidically closes main duct layer 12. Bottom layer 13 may preferably consist of reflective material or comprise a thin coating thereof, so that light which impinges from a viewing direction B through cavities 2 and display liquid (not represented) optionally present therein, is reflected to the viewer, to thereby improve the visibility of the content of the respective display element. Not represented is an optionally also provided illuminating layer which is arranged underlying bottom layer 13, from which for example light created by surface radiators is irradiated in direction of the viewer.

Figure 3:
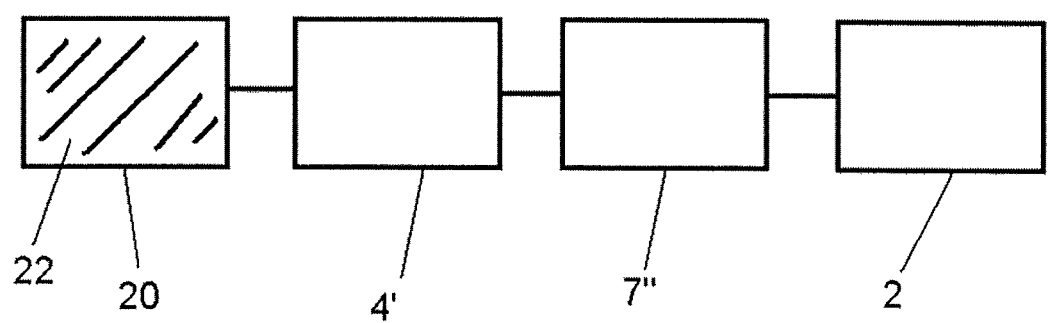
FIG. 3 shows a schematic view of a device according to the invention.

Further, referring to the schematic view of FIG. 3, the central liquid reservoir 20 which is preferably to be used which can for example arrange between main duct layer 12 and bottom layer 13. In this case, main ducts 4 may be omitted, so that the display liquid 22 can directly retransverse ducts 4' by correspondingly arranged openings of the central liquid reservoir, and can reach dosing devices (not represented) of display elements 1.

The device according to the invention and the method according to the invention offer in particular the advantage versus the prior art that by means of precise dosing of defined volumes of display liquid precisely determinable volumes of display liquid are present in a display element, so that different brightness or saturation stages can be represented in an individual display element. Further, the device has a low power consumption during operation, i.e. during updating the fluidic display device, wherein the power consumption during static operation is practically zero. Finally, the device enables, beside monochrome and representations of different brightness levels also colored representations. Mass production is possible due to the simple basic modules, and due to the flexibility of lining plural "tiles" including groups of display elements, the concept is suitable for small as well as for large format displays.

The invention claimed is:

1. A fluidic display device, comprising
at least one display liquid for displaying information, wherein said display liquid can be influenced in its surface energy by an electric field;
a plurality of display elements each having a cavity;
at least one liquid reservoir for providing said at least one display liquid;
a dosing device for each display element, wherein said at least one display liquid can be dosed from said at least one liquid reservoir into at least one of said display elements and can be dosed out thereof; and
at least one collector means for filling the display liquid into or emptying it out of each display element, each collector means comprising at least one collector electrode which is arranged in a respective display element such that said electric field can be applied thereby to the display liquid in the respective display element, wherein said at least one collector electrode comprises a beam-like shape, having arms which increase in their width towards a site for removing said display liquid from said respective display element.

2. The device of claim 1, wherein said dosing device comprises
a dosing duct for receiving a volume of said display liquid to be dosed comprising
a group of dosing electrodes for dosing a defined volume of said display liquid which are adapted to be controlled independently from one another, wherein said dosing electrodes are arranged such that a locally variable electric field can be applied to the display liquid present in said dosing duct.

3. The fluidic display device of claim 1, wherein said collector means and said dosing device are adapted to be controlled independently.

4. The fluidic display device of claim 1, wherein the plurality of display elements can be combined to tiles and the fluidic display device comprises at least one tile.

5. The fluidic display device of claim 4, wherein the at least one tile comprises the following layers:
a transparent cover layer at least in a region of the cavities of said display elements which is common to all display elements,
a patterned chamber layer having partitions for delimiting single display elements, and
a common bottom layer for fluidical closure,
wherein said tile for fluidic delivery of said display elements further comprises either
a patterned main duct layer or
main ducts integrated into said chamber layer or
a reservoir layer as well as passages to said display elements.

6. The fluidic display device of claim 5, for each display element further comprising an electrode layer for receiving the at least one collector electrode of said at least one collector means and/or for receiving one or more dosing electrodes of said dosing device.

7. The fluidic display device of claim 5 comprising plural chamber layers and main duct layers as well as electrode layers which are stacked upon one another.

8. A method for displaying information, wherein an image to be displayed can be divided into single image dots which can be displayed by display elements, comprising the following steps:
(a) providing a fluidic display device, comprising
at least one display liquid for displaying information, wherein said display liquid can be influenced in its surface energy by an electric field;
a plurality of display elements each having a cavity;
at least one liquid reservoir for providing said at least one display liquid;
a dosing device for each display element, wherein said at least one display liquid can be dosed from said at least one liquid reservoir into at least one of said display elements and can be dosed out thereof; and
at least one collector means for filling the display liquid into or emptying it out of each display element, each collector means comprising at least one collector electrode which is arranged in a respective display element such that said electric field can be applied thereby to the display liquid in the respective display element, wherein said at least one collector electrode comprises a beam-like shape, having arms which increase in their width towards a site for removing display liquid from said respective display element;

(b) providing said display liquid from said liquid reservoir;

(c) dosing a defined volume of said display liquid into the cavities or from said cavities of said display elements; and (d) repeating step (c) until a desired total volume of liquid is present in said cavities.

9. The method of claim 8, wherein the dosing device for each display element comprises a plurality of dosing electrodes, and wherein, for dosing the display liquid into at least one cavity of at least display element, the following steps are performed:

(b1) switching on at least one dosing electrode which is most remote from said cavity of said display element, so that the display liquid moves from the liquid reservoir into a dosing duct;

(b2) switching on remaining dosing electrodes, so that finally a volume of the display liquid is present in said dosing duct which is larger than the defined liquid volume;

(b3) switching off some of said dosing electrodes, so that a separated droplet of display liquid having a defined liquid volume remains on those dosing electrodes which are still switched on;

(b4) additionally switching on dosing electrodes which are arranged between said cavity and the latter defined liquid volume, so that the latter defined liquid volume spreads in direction of the cavity;

(b5) successively switching off the switched on dosing electrodes from direction of the liquid reservoir, so that the latter defined liquid volume is delivered in direction of said cavity.

10. The method of claim 8, wherein, for dosing the display liquid from at least one cavity of at least one display element, the following steps are performed:

(B1) switching on the at least one collector electrode so that the display liquid is collected in the region of the cavity which is closest to a dosing duct;

(B2) switching on at least that dosing electrode which is closest to the cavity of said display element, so that the display liquid moves from said cavity into said dosing duct;

(B3) switching on the remaining dosing electrodes so that finally a volume of display liquid is present in said dosing duct which is larger than the defined liquid volume;

(B4) switching off some of said dosing electrodes so that a separated droplet of display liquid having a defined liquid volume remains on those dosing electrodes which are still switched on;

(B5) additionally switching on those dosing electrodes which are arranged between said liquid reservoir and the latter defined liquid volume, so that the latter defined liquid volume spreads in direction of said liquid reservoir;

(B6) successively switching off dosing electrodes from direction of said cavity, so that the latter defined liquid volume is delivered in direction of said liquid reservoir;

wherein furthermore said collector electrode is switched off not earlier than after step (B4).

11. The method of claim 8, wherein said collector means and said dosing devices are adapted to be controlled independently, and wherein the display liquid is simultaneously dosed in or out of plural or all display elements for display.

12. The method of claim 8, wherein the fluidic display device provided further comprises:

a plurality of lines of display elements and further a means for column selection, wherein said collector means is adapted to be controlled jointly line by line, and a plurality of columns of display elements and further a means for line selection, wherein said dosing device includes a plurality of dosing electrodes that are adapted to be controlled column by column, wherein furthermore, prior to step (a), the following step is performed for display:

selecting a specific column of display elements to be filled, or, selecting a specific line of display elements to be filled, respectively, so that, by controlling a line of the collector means or a column of dosing electrodes, which are adapted to be controlled jointly, thereafter it is dosed into or out of only those display elements of said specific column or line, respectively, and wherein the process is repeated, while previously selecting a further column or line, respectively, until all desired columns or lines, respectively, are selected.

13. The method of claim 8, further comprising at least one of the following steps for updating an image to be displayed:

selecting a tile of display elements to be filled; and/or selecting a chamber layer, which is one layer of layers of the tile to be filled, and the display liquid;

wherein the step(s) is/are performed prior to step (a) and the entire sequence is repeated until the desired number of tiles or chamber layers has been updated.

* * * * *